United States Patent
Katsuyama et al.

(10) Patent No.: US 9,417,334 B2
(45) Date of Patent: Aug. 16, 2016

(54) RADIATION MEASURING INSTRUMENT

(71) Applicant: HITACHI ALOKA MEDICAL, LTD., Mitaka-shi, Tokyo (JP)

(72) Inventors: Hiraku Katsuyama, Mitaka (JP); Toru Kato, Mitaka (JP); Toshiro Obata, Mitaka (JP)

(73) Assignee: HITACHI ALOKA MEDICAL, LTD., Tokyo (JP)

(*) Notice: Subject to any disclaimer, the term of this patent is extended or adjusted under 35 U.S.C. 154(b) by 0 days.

(21) Appl. No.: 14/786,223

(22) PCT Filed: Apr. 22, 2014

(86) PCT No.: PCT/JP2014/061327
§ 371 (c)(1),
(2) Date: Oct. 22, 2015

(87) PCT Pub. No.: WO2014/175283
PCT Pub. Date: Oct. 30, 2014

(65) Prior Publication Data
US 2016/0170037 A1   Jun. 16, 2016

(30) Foreign Application Priority Data

Apr. 25, 2013 (JP) ................................. 2013-091917

(51) Int. Cl.
*G01J 1/00* (2006.01)
*G01T 1/00* (2006.01)
(Continued)

(52) U.S. Cl.
CPC ... *G01T 1/17* (2013.01); *G01T 1/00* (2013.01); *G01T 1/161* (2013.01); *G01T 1/164* (2013.01); *G01T 1/36* (2013.01)

(58) Field of Classification Search
CPC .......... G01T 1/00; G01T 1/161; G01T 1/164; G01T 1/17; G01T 1/36
USPC ....................................... 250/336.1
See application file for complete search history.

(56) References Cited

U.S. PATENT DOCUMENTS

| | | | | |
|---|---|---|---|---|
| 6,392,236 B1 * | 5/2002 | Maekawa | ............. | G01T 1/2008 250/369 |
| 2002/0146087 A1 * | 10/2002 | Izumi | ........................ | G01T 1/17 376/245 |
| 2003/0033097 A1 | 2/2003 | Tanaka et al. | | |

FOREIGN PATENT DOCUMENTS

| | | |
|---|---|---|
| EP | 1074856 A2 | 2/2001 |
| JP | 48-10103 B | 3/1973 |

(Continued)

OTHER PUBLICATIONS

Notification of Transmittal of Translation of International Preliminary Report on Patentability (Form PCT/IB/338) issued in counterpart International Application No. PCT/JP2014/061327 mailed Oct. 29, 2015. (15 pages).

(Continued)

*Primary Examiner* — David Porta
*Assistant Examiner* — Meenakshi Sahu
(74) *Attorney, Agent, or Firm* — Westermna, Hattori, Daniels & Adrian, LLP (57) ABSTRACT

Preprocessing is conducted on a unipolar pulse output from a photomultiplier tube, to thereby generate a bipolar signal (bipolar pulse). In the bipolar signal, the falling waveform portion (back slope) of the initial peak waveform is steep, and also cuts across the baseline, whereby it is possible to accurately identify the falling point as the zero crossing point. The accuracy of identification of the pulse width "t" can be improved thereby. In addition to the pulse width, further reference may be made to the crest value of the unipolar pulse, the crest value of the bipolar signal, and the like, when determining line type.

10 Claims, 4 Drawing Sheets

(51) Int. Cl.
*G01T 1/17* (2006.01)
*G01T 1/36* (2006.01)
*G01T 1/161* (2006.01)
*G01T 1/164* (2006.01)

(56) References Cited

FOREIGN PATENT DOCUMENTS

| | | |
|---|---|---|
| JP | 57-119275 A | 7/1982 |
| JP | 61-71381 A | 4/1986 |
| JP | 5-19061 A | 1/1993 |
| JP | 8-82681 A | 3/1996 |
| JP | 9-230052 A | 9/1997 |
| JP | 9-304538 A | 11/1997 |
| JP | 2000-74968 A | 3/2000 |
| JP | 2000-227479 A | 8/2000 |
| JP | 2002-350545 A | 12/2002 |
| JP | 2003-215251 A | 7/2003 |
| JP | 2006-98081 A | 4/2006 |
| JP | 2006-329784 A | 12/2006 |

OTHER PUBLICATIONS

Notification of Grounds for Rejection dated Jun. 10, 2014, issues in corresponding Japanese application No. 2013-091917, w/ English translation (4 pages).

Notification of Grounds for Rejection dated Jan. 6, 2015, issues in corresponding Japanese application No. 2013-091917, w/ English translation (4 pages).

International Search Report dated Jun. 17, 2014, issued in counterpart International Application No. PCT/JP2014/061327 (2 pages).

T. K. Alexander et al., "An amplitude-insensitive system that distinguishes pulses of different shapes", Nuclear Instruments and Methods, vol. 13, (1961) pp. 244-246.

Glenn F. Knoll, "Wiley: Radiation Detection and Measurement, Fourth Edition", (2010), pp.. 1-3.

L. J. Heistek et al., "Pulse Shape Discrimination With a Comparator Circuit", Nuclear Instruments and Methods, vol. 80, No. 2, (1970), pp. 213-216.

G. W. McBeth et al., "A Simple Zero Crossing Pulse Shape Discrimination System", Nuclear Instruments and Methods, vol. 93, No. 1 (1971) pp. 99-102.

John W McKlveen et al., "Some Studies of Reflector Construction and Electronics Configurations for Optimizing Pulse-Height and Pulse-Shape Resolution in Alpha Liquid-Scintillation Spectrometry", Nuclear Technology, American Nuclear Society, Chicago IL, US, vol. 28, No. 1, (1976) pp. 159-164.

Extended (Supplementary) European Search Report dated Jun. 7, 2016, issued in counterpart European Patent Application No. 14788362.3. (10 pages).

* cited by examiner

RADIATION MEASURING INSTRUMENT

TECHNICAL FIELD

The present invention relates to a radiation measuring instrument, and more particularly to a radiation measuring instrument for detecting α-rays and β-rays while discriminating between α-rays and β-rays.

BACKGROUND ART

Radiation measuring instruments for measuring α-rays and β-rays utilize a difference in frequency characteristics and crest values between a detected pulse generated by α-rays (α-ray detected pulse) and a detected pulse generated by β-rays (β-ray detected pulse) to discriminate between the α-ray detected pulse and the β-ray detected pulse output from a detector. Patent Documents 1 and 2, for example, disclose a radiation measuring instrument including an α-ray separation filter and a crest value discrimination circuit. Patent Document 3 discloses a radiation measuring instrument which applies simultaneous counting processing to pulses output from two photomultiplier tubes for cutting noise, and, based on the pulse widths of the pulses having been subjected to the simultaneous counting processing, discriminates between an α-ray detected pulse and a β-ray detected pulse.

CITATION LIST

Patent Literature

PATENT DOCUMENT 1: JP H5-19061 A
PATENT DOCUMENT 2: JP H9-304538 A
PATENT DOCUMENT 3: JP H9-230052 A

SUMMARY OF THE INVENTION

Technical Problem

A detected pulse output from a detector composed of a scintillator and a photomultiplier tube, for example, is a unipolar pulse appearing on a negative polarity side (or a positive polarity side). The unipolar pulse generally includes a steep rising portion (also referred to as a leading edge) from a rising point to a peak point, and a relatively gentle falling portion (also referred to as a trailing edge) from the peak point to a baseline. The pulse width (time width near the baseline) of such a detected pulse depends on the radiation type. In general, the pulse width of an α-ray detected pulse is greater than the pulse width of a β-ray detected pulse. It is therefore possible to use the pulse width as a criterion for discriminating between radiation types. For example, the waveform of a detected pulse is compared with a threshold value, a rising point and a falling point are specified as points crossing the threshold value, and the interval between these points is specified as a pulse width. In the specification of the present application, a change in the amplitude away from the baseline will be referred to as "rising" and a change in the amplitude approaching the baseline will be referred to as "falling," regardless of polarity. A "rising point" generally refers to a start point or a leading end point (including corresponding points thereof) of a slope existing immediately before the peak point, and a "falling point" generally refers to an end point or a trailing point (including corresponding points thereof) of a slope existing immediately after the peak point. As the accuracy in identification of the pulse width significantly affects the accuracy in discrimination of the radiation type when the pulse width is used for discrimination of nuclide, it is necessary to constitute a circuit such that the pulse width can be identified as accurately as possible. However, as the falling portion of a detected pulse has a gentle shape, particularly near the baseline, there arises a problem that a slight change in the shape of that portion can easily cause a shift of the points crossing the threshold value level toward the direction of a time axis.

Here, it is desirable, in terms of accuracy in discrimination, to use a pulse crest value, in addition to the pulse width, as a discrimination criterion, because the pulse width of a detected pulse depends on a crest value and a tendency of a large error can be acknowledged particularly in the case of a small amplitude. In determination of the radiation type, effects of noise superposition, signal saturation after amplification, adjacent pulses, and the like can also be considered. As the possible range of the crest value of an α-ray detected pulse and the possible range of the crest value of a β-ray detected pulse generally partially overlap each other, it is difficult to discriminate between an α-ray detected pulse and a β-ray detected pulse based only on the crest values. It is therefore desirable to perform discrimination of the radiation type using both the crest value criterion and the pulse width criterion.

It is therefore an advantage of the present invention to increase the accuracy in discrimination between an α-ray detected pulse and a β-ray detected pulse, and particularly to eliminate or alleviate the problem of a reduction in the accuracy in discrimination caused by a change in the shape of a falling portion in a detected pulse.

Solution to Problem

A radiation measuring instrument according to an aspect of the invention includes a detector configured to detect α-rays and β-rays and output a unipolar pulse, a preprocessing circuit configured to generate a bipolar pulse by applying waveform processing to the unipolar pulse output from the detector, a pulse width signal generating circuit configured to generate a pulse width signal representing a pulse width from a rising point to a falling point of the bipolar pulse, and a radiation type determining circuit configured to determine a radiation type of radiation from which the unipolar pulse is generated based at least on the pulse width signal.

With the above structure, as a unipolar pulse is converted to a bipolar pulse (i.e. a bipolar signal) before identification of the pulse width, it is possible to increase the accuracy in identification of the pulse width. More specifically, as a bipolar pulse has a first falling portion which is steeper near the baseline than a falling portion of a unipolar pulse, and also, unlike the falling portion of a unipolar pulse, the falling portion of the bipolar pulse passes across the baseline, the accuracy in identification of the falling point can be increased. The falling point can be identified as a point where the falling portion crosses a predetermined threshold value, and in this case, if the predetermined threshold value is on the baseline, the falling point is defined as a cross point crossing the baseline, which is easy to identify. The baseline may be at a level which is offset from the level of 0 potential, in which case the point crossing the baseline can be similarly referred to as a cross point. It is also possible to specify a rising point as a point separated from the baseline or a point crossing the baseline. The levels for specifying the rising point and the falling point may not necessarily be the same. In other words, the pulse width signal generating circuit may have a hysteresis characteristic. The preprocessing circuit may be formed of a differentiating circuit and an integrating circuit which are connected in series. In any case, a characteristic of the above structure is to generate a bipolar pulse from a unipolar pulse.

Preferably, the bipolar pulse includes a first portion protruding from the baseline toward one side and a second portion protruding from the baseline toward the other side, and the second portion is continuous to the first portion. The rising point is a front end point of the first portion and the falling point is a back end point of the first portion.

Preferably, the detector includes one or a plurality of photomultiplier tubes. It is particularly preferable that the detector includes a single photomultiplier tube. It is desirable to configure the instrument such that α-ray detection and β-ray detection can be comprehensively determined based only on an output signal from such a single photomultiplier tube.

Preferably, the pulse width signal generating circuit includes a reference signal generating circuit configured to generate a reference signal by smoothing the bipolar pulse, and a comparison circuit configured to compare the bipolar pulse with the reference signal to identify the rising point and the cross point. With this structure, in order to generate a pulse width signal from a bipolar pulse, a reference signal which is generated from the bipolar pulse itself is used. The reference signal is generated by smoothing the bipolar pulse, and corresponds to the baseline of the bipolar pulse. Thus, as a shift generated in the baseline of the bipolar pulse would cause a similar a shift in the reference signal, it is possible to achieve comparison processing which is not affected by such a shift. In other words, the above structure can provide an advantage that the processing is not susceptible or is hardly susceptible to the effect of a level change in the baseline. When a bipolar pulse is compared with a reference signal, in order to identify the rising point more accurately, it is desirable to add some offset to the bipolar pulse in the direction opposite the rising direction.

Preferably, the radiation type determining circuit determines the radiation type based on the crest value of the bipolar pulse and the crest value of the unipolar pulse in addition to the pulse width of the bipolar pulse. As this structure enables multifaceted and comprehensive determination, it is possible to increase the accuracy in determination. In particular, assessment of a unipolar pulse from which a bipolar pulse is generated enables determination of a nuclide in consideration of an assessment result of a signal which has not been affected by preprocessing.

Preferably, the radiation measuring instrument further includes a large pulse detected signal generating circuit configured to generate a large pulse detected signal indicating that the unipolar pulse is a large pulse having a level higher than a large pulse discrimination level and to output the large pulse detected signal to the radiation type determining circuit, and a pulse exceeding the large pulse discrimination level is regarded as a pulse obtained by α-ray detection.

Preferably, the radiation measuring instrument further includes an effective pulse discrimination signal generating circuit configured to generate an effective pulse discrimination signal indicating that the bipolar pulse is an effective pulse having a level higher than a noise cut level and to output the effective pulse discrimination signal to the radiation type determining circuit, and the noise cut level is a level for discriminating between noise and the effective pulse.

Preferably, the radiation measuring instrument further includes a high level discrimination signal generating circuit configure to generate a high level discrimination signal representing whether the bipolar pulse is higher or lower than an intermediate level and to output the high level discrimination signal to the radiation type determining circuit, and the intermediate level is a level for discriminating between a high crest value that can be generated by α-ray detection and β-ray detection and a low crest value that can be generated only by β-ray detection.

EMBODIMENTS

A preferred embodiment of the present invention will be described with reference to the drawings.

Figure 1:
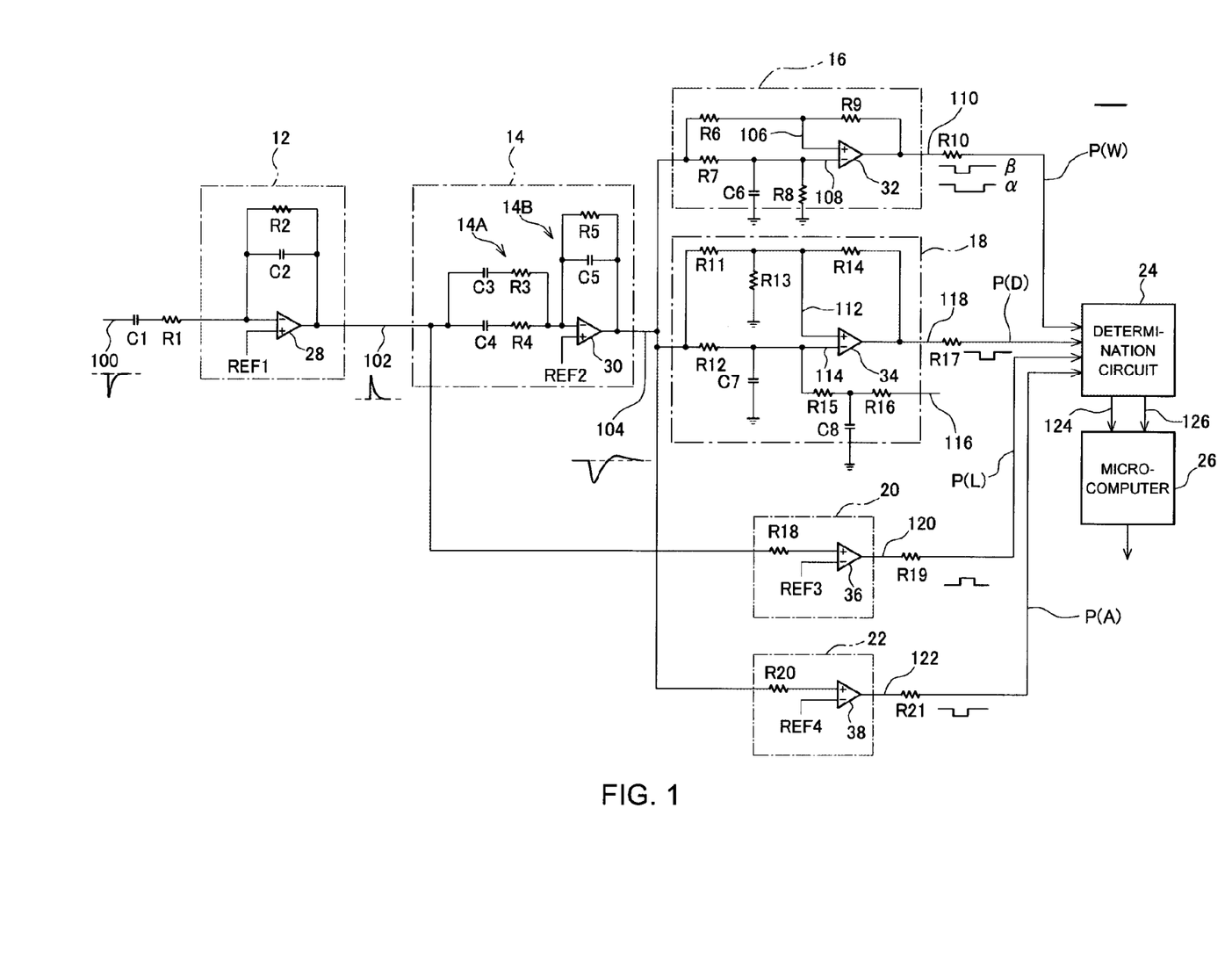
FIG. 1 Circuit diagram illustrating a radiation measuring instrument according to a preferred embodiment of the present invention.

FIG. 1 illustrates a preferred embodiment of a radiation measuring instrument according to the present invention, and is a circuit diagram thereof. The radiation measuring instrument in the present embodiment is a survey meter, for example. It is of course possible to apply other radiation measuring instruments to the present invention.

The radiation measuring instrument illustrated in FIG. 1 includes a scintillator functioning as a detector, and a photomultiplier tube. The scintillator emits light when α-rays and β-rays enter. The light then enters the photomultiplier tube where the light is converted into an electrical pulse. In the present embodiment, only a single photomultiplier tube is provided. An output pulse 100 from the photomultiplier tube is a unipolar pulse generated on the negative (−) polarity side in the present embodiment. Here, a plurality of photomultiplier tubes may be provided.

The radiation measuring instrument according to the present embodiment includes a first amplifier 12, a second amplifier 14, a pulse width signal generating circuit 16, an effective pulse discrimination signal generating circuit 18, a large pulse determination signal generating circuit 20, a high level discrimination signal generating circuit 22, a determination circuit 24, and a microcomputer 26. Each circuit will be described in detail below.

The first amplifier 12 receives the output pulse 100 from the photomultiplier tube input thereto. The output pulse 100 has a shape projecting from the baseline toward the negative polarity. A capacitor C1 and a resistor R1 are provided on the input side of the first amplifier 12. The first amplifier 12 is a circuit that performs inverting amplification, and includes an operational amplifier 28 having an inverting amplification function. The above-described output pulse 100 is input to a negative (−) terminal of the operational amplifier 28, and a reference signal (REF1) is input to a positive (+) terminal of the operational amplifier 28. The reference signal refers to a signal that represents a reference potential.

The operating characteristic of the operational amplifier 28 is set by an RC circuit which is formed of a resistor R2 and a capacitor C2. The first amplifier 12 outputs an inverting-amplified signal 102 to the second amplifier 14.

The second amplifier 14 is a circuit that performs preprocessing for converting the signal 102, which is a unipolar pulse, to a bipolar pulse (bipolar signal) in the present embodiment. The second amplifier 14 includes a differentiating circuit 14A and an integrating circuit 14B that are connected in series. The differentiating circuit 14A includes two capacitors C3 and C4 connected in parallel to each other and resistors R3 and R4 connected in parallel to each other. The integrating circuit 14B includes an operational amplifier 30. An output signal from the differentiating circuit 14A is supplied to a negative (−) terminal of the operational amplifier 30 and a reference signal (REF2) is supplied to a positive (+) terminal of the operational amplifier 30. The reference signal represents a reference potential. The operating characteristic of the operational amplifier 30 is determined by an RC circuit which is specifically formed of a resistor R5 and a capacitor C5.

A protection circuit which is provided before the first amplifier 12 is not shown in FIG. 1. The potential of each reference signal can be variably set by a control circuit, which is not shown.

With the operation of the second amplifier 14, a bipolar pulse; that is, a bipolar signal, is generated from a unipolar pulse. FIG. 1 shows a bipolar signal denoted by reference numeral 104. The bipolar signal 104 is output, in parallel, to the pulse width signal generating circuit 16, the effective pulse discrimination signal generating circuit 18, and the high level discrimination signal generating circuit 22, which are provided after the second amplifier 14. Here, the output signal 102 of the first amplifier 12 is output to the second amplifier 14 or is output to a large pulse determination signal generating circuit 20 not via the second amplifier 14.

The pulse width signal generating circuit 16 generates a pulse width signal P(W) based on the bipolar signal 104. The pulse width signal generating circuit 16 includes an operational amplifier 32 which functions as a comparator. The bipolar signal 104 is input to a positive (+) terminal 106 of the operational amplifier 32 via a resistor R6 and this signal is referred to as a noted signal 106. A reference signal 108 is input to a negative (−) terminal of the operational amplifier 32.

In the present embodiment, the reference signal 108 is generated based on the bipolar signal 104 itself. Specifically, the reference signal 108 is generated by applying smoothing processing to the bipolar signal 104. This structure enables generation of the pulse width signal P(W) without being affected by a variation of level of the baseline of the bipolar signal 104. A resistor R7 and the capacitor C6 are provided for the purpose of smoothing the bipolar signal 104. A resistor R8 is provided to determine the potential.

A resistor R9 which functions as a feedback resistor raises the level of the noted signal 106 slightly from the baseline toward the positive polarity side to thereby provide an offset to the noted signal 106. Application of such shift processing enables reliable detection of the rising point of the noted signal 106. In the present embodiment, a zero cross point with the baseline is detected as the rising point. In other words, the pulse width signal generating circuit 16 has a hysteresis characteristic.

An output signal 110 from the pulse width signal generating circuit 16 is supplied, as the pulse width signal P(W), to the determination circuit 24 via a resistor R10. As will be described in detail below, the pulse width signal P(W) is a signal which represents a period (pulse width) from the first rising point to the subsequent zero cross point in the bipolar signal 104. When α-rays are detected, a signal having a pulse width of 1.0 µs to 3.0 µs, for example, is generated, and when β-rays are detected, a signal having a pulse width of less than 1.0 µs is generated.

The effective pulse discrimination signal generating circuit 18 includes an operational amplifier 34 which functions as a comparator. The bipolar signal 104 is applied to a positive (+) terminal of the effective pulse discrimination signal generating circuit 18 as a noted signal 112 via a resistor R11. A resistor R13 is provided between the output side of the resistor R11 and ground. A resistor R14 is a feedback resistor.

A reference signal 114 is input to a negative (−) terminal of the operational amplifier 34. The reference signal 114 is generated based on the bipolar signal 104 itself. More specifically, the reference signal 114 is generated by smoothing the bipolar signal. A resistor R12 and a capacitor C7 are provided for smoothing. This structure also enables comparison processing of signals without being affected by a variation of the level of the baseline in the bipolar signal 104. Further, a control signal 116 is applied to an input line to the negative (−) terminal of the operation amplifier 34. The control signal 116 can externally control the potential of the reference signal 114, so that the noise cut level can be variably set. Resistors R15, R16, and a capacitor C8 are provided for the operation of potential by the control signal 116.

The effective pulse discrimination signal generating circuit 18 discriminates pulses exceeding the noise cut level as being effective pulses, and outputs an effective pulse discrimination signal P(D) representing an effective pulse. Specifically, an output signal 118 from the operational amplifier 34 is applied, as an effective pulse discrimination signal P(D), to the determination circuit 24 via a resistor R17.

The high level discrimination signal generating circuit 22 is a circuit which generates a high level discrimination signal P(A) which indicates that an effective pulse has a high crest value. More specifically, the high level discrimination signal generating circuit 22 includes an operational amplifier 38 which functions as a comparator. The bipolar signal 104 is input to a positive (+) terminal of the operational amplifier 38 via a resistor R20, and a reference signal (REF4) is applied to a negative (−) terminal of the operational amplifier 38. The reference signal provides a reference potential which represents an intermediate level for discriminating the peak crest values. When a crest value which is higher than the intermediate level is input, the operational amplifier 38 outputs a high level discrimination signal P(A). More specifically, an output signal 122 from the operational amplifier 38 is applied, as a high level discrimination signal P(A), to the determination circuit 24, via a resistor R21.

The large pulse determination signal generating circuit 20 assesses the output signal from the first amplifier 12. Specifically, the large pulse determination signal generating circuit 20, referring to the signal 102 which has not been preprocessed in the second amplifier 14, performs more reliable determination with reference to the original pulse waveform. With this structure, even if a signal is saturated in the second amplifier 14, it is possible to assess a signal before saturation. The large pulse determination signal generating circuit 20 includes an operational amplifier 36 which functions as a comparator, and the output signal 102 from the first amplifier 12 is input to a positive (+) terminal of the operational amplifier 36 via a resistor R18. The output signal 102 is a unipolar pulse generated on the positive polarity side. A reference signal (REF3) which indicates a potential for determining a large pulse is applied to a negative (−) terminal of the operational amplifier 36. The operational amplifier 36, when a pulse which is higher than that potential is input thereto, outputs a large pulse determination signal P(L). Specifically, the output signal 120 from the operational amplifier 36 is applied, as a large pulse determination signal P(L), to the determination circuit 24 via a resistor R19.

The determination circuit 24, based on the pulse width signal P(W), the effective pulse discrimination signal P(D), the large pulse determination signal P(L), and the high level discrimination signal P(A) that are input, determines the radiation type in a multifaceted and comprehensive manner. The determination circuit 24 outputs an α-detected pulse 124 when detection of α-rays is determined and outputs a β-detected pulse 126 when detection of β-rays is determined. The microcomputer 26 individually counts these pulses 124 and 126, thereby obtaining a result of α-ray counting and a result of β-ray counting independently. Based on these results, various measurement values such as a dose, a dose rate, a dose equivalent, and the like are calculated and displayed on an indicator. Further, the microcomputer 26 controls the potential of the control signal 116 described above.

Figure 2:
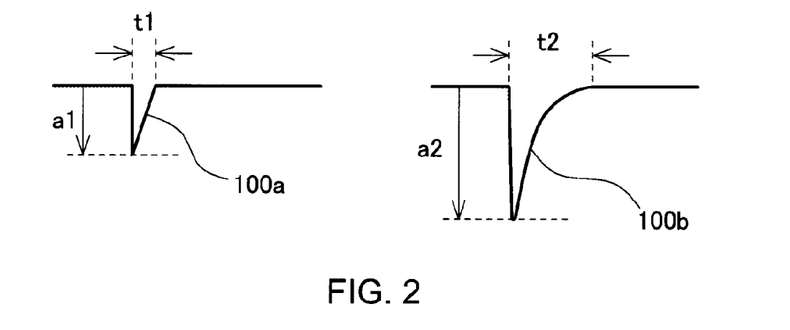
FIG. 2 Diagram illustrating a β-ray detected pulse and an α-ray detected pulse each as a unipolar pulse.

The operation of the circuit illustrated in FIG. 1 will be described. FIG. 2 illustrates the above-described unipolar pulse, which is an output pulse of a photomultiplier tube. Specifically, FIG. 2(A) shows a β-ray detected pulse 100a generated by detection of β-rays, and FIG. 2(B) shows an α-ray detected pulse 100b generated by detection of α-rays. In the β-ray detected pulse 100a, a1 indicates a pulse crest value (a height from the baseline to a peak) and t1 indicates a pulse width (a range on the time axis). In the α-ray detected pulse 100b, a2 indicates a pulse crest value and t2 indicates a pulse width. In general, a relationship of a1<a2 and a relationship of t1<t2 are satisfied. Here, the pulse widths t1 and t2 should be noted. In a unipolar pulse, the falling waveform portion becomes gentler as it approaches the baseline, which makes it difficult to specify the pulse width accurately.

Figure 3:
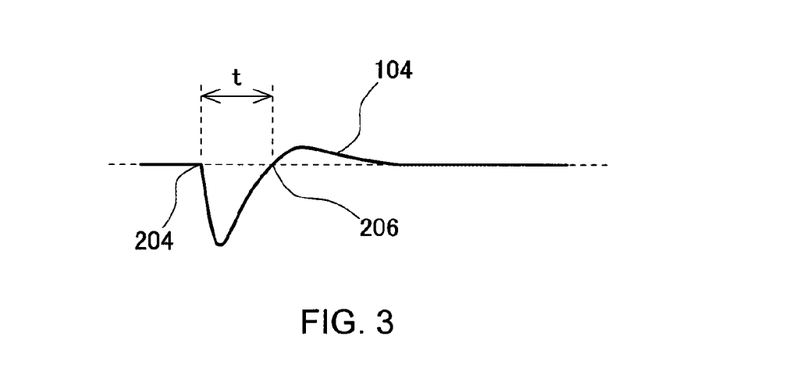
FIG. 3 Diagram illustrating a bipolar pulse (a bipolar signal)

In the present embodiment, in order to specify the pulse width with higher accuracy, a unipolar pulse is converted to a bipolar signal, as illustrated in FIG. 3. Specifically, the bipolar signal is a bipolar pulse generated from the unipolar pulse, and in the structure illustrated in FIG. 1, the bipolar signal 104 is generated by applying differentiation processing and integration processing stepwise to the output signal from the first amplifier 12. The bipolar signal 104 includes a first portion in a convex shape protruding from the baseline toward one side (negative polarity side) and a second portion in a convex shape protruding from the baseline toward the other side (positive polarity side). The second portion starts immediately after the first portion and these portions are contiguous to each other.

In the bipolar signal 104, the first rising portion (a slope as a leading edge) existing immediately before the peak is significantly steep, so that a first rising point 204 can be clearly specified. The first rising point corresponds to a start point or a front end point of the rising portion (or the first portion described above). The falling portion (a slope as a trailing edge) existing immediately after the first peak is steeper than the falling portion in the unipolar pulse, and crosses the baseline. It is therefore possible to clearly specify a falling point or a zero crossing point 206. The falling point corresponds to a terminal point or a back end point of the falling portion (or the first (second?) portion). As described above, it is possible to specify the pulse width "t" with high accuracy based on a bipolar signal, so that accuracy in discrimination between α-ray detection and β-ray detection can be enhanced.

Figure 4:
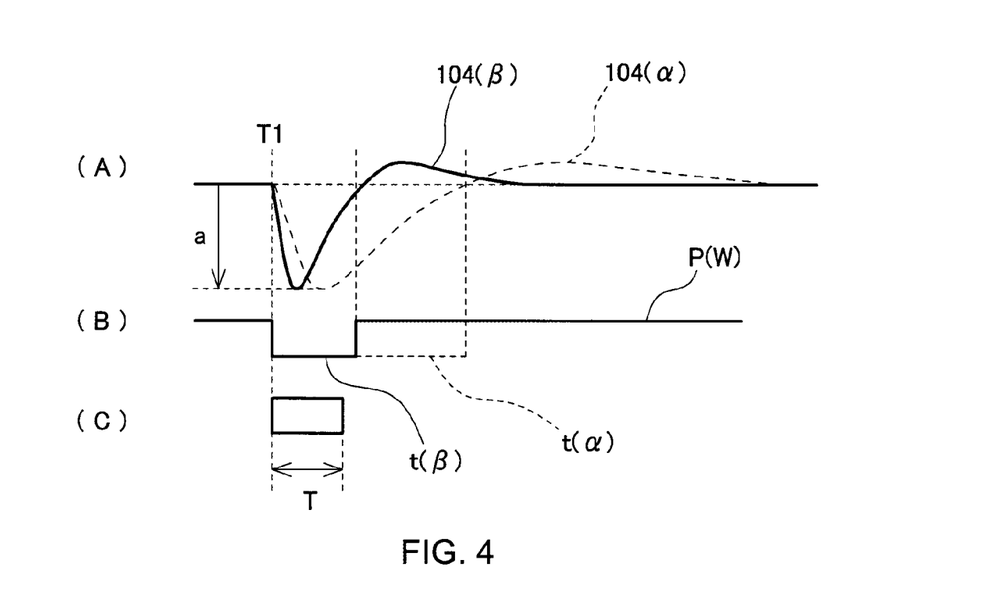
FIG. 4 Diagram for explaining generation of a pulse width signal.

FIG. 4 illustrates an operation of the pulse width signal generating circuit illustrated in FIG. 1. FIG. 4(A) shows a bipolar signal which is to be input. More specifically, reference numeral 104(β) denotes a bipolar signal generated by detection of β-rays, and reference numeral 104(α) denotes a bipolar signal generated by detection of α-rays. In this example, the level of the peak of these signals is denoted by "a." FIG. 4(B) shows a pulse width signal P(W), in which t(β) denotes a pulse width of the bipolar signal 104(β) generated by detection of β-rays, and t(α) denotes a pulse width of the bipolar signal 104(α) generated by detection of α-rays. Such a significant difference in the pulse width between when β-rays are detected and when α-rays are detected can be utilized to identify the radiation type. In the present embodiment, whether or not the pulse width exceeds 1 µs is used to identify the radiation type.

Further, FIG. 4(C) shows a determination gate period, which is defined as a period of 0.5 seconds, for example, from the timing T1 of the rising point. Within the determination gate period, a determination is made as to whether or not the effective pulse discrimination signal P(D), the large pulse determination signal P(L), and the high level discrimination signal P(A) are generated.

Figure 5:
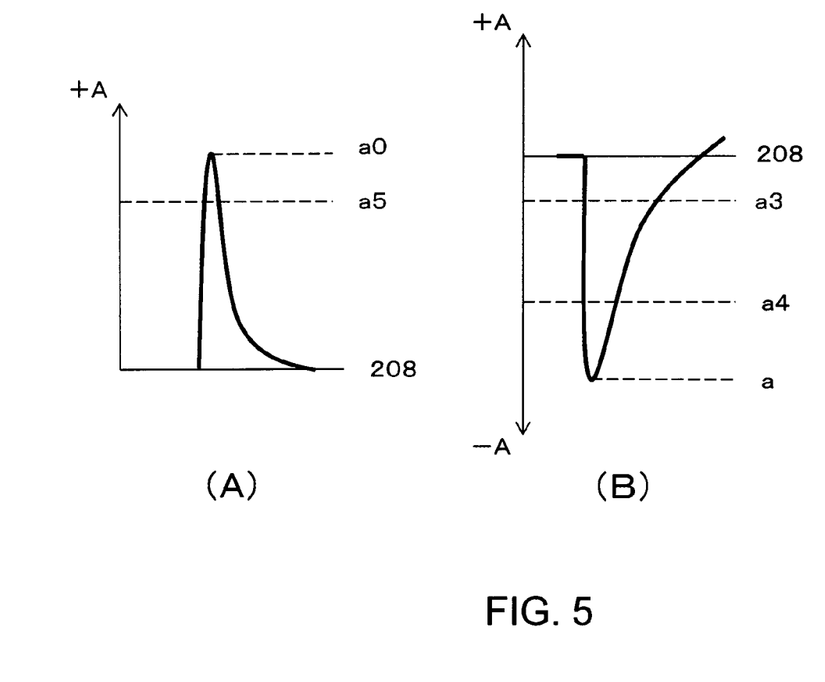
FIG. 5 Diagram showing a large pulse discrimination level, a noise cut level, and an intermediate level.

FIG. 5 illustrates various discrimination levels to be compared to waveforms. FIG. 5(A) illustrates the output signal of the first amplifier illustrated in FIG. 1. In FIG. 5, the horizontal axis denotes a time axis and the vertical axis represents an amplitude. Reference numeral 208 denotes the baseline, and reference numeral a5 denotes the large pulse discrimination level, which corresponds to REF3 described above. As shown in FIG. 5(A), when the crest value a0 of the output signal exceeds the large pulse discrimination level a5, the large pulse determination signal P(L) is output.

FIG. 5(B) illustrates the bipolar signal described above. In FIG. 5(B), the vertical axis denotes an amplitude and the horizontal axis is a time axis. Reference numeral 208 denotes the baseline, and reference numeral a3 denotes the noise cut level, which corresponds to the signal 114 illustrated in FIG. 1. Reference numeral a4 denotes the intermediate level which corresponds to the REF4 described above. When the crest value "a" exceeds the noise cut level a3, the pulse is determined as an effective pulse. In other words, when the crest value "a" does not reach the noise cut level a3, the signal is regarded as noise.

Accordingly, a signal exceeding the noise cut level "a3" is regarded as an effective pulse. In order to assess the magnitude of the pulse, the intermediate level "a4" is defined. In the present embodiment, when the crest value "a" exceeds the intermediate level "a4," a possibility of β-ray detection and α-ray detection is acknowledged, and the high level discrimination signal P(A) is output. When the crest value "a" does not exceed the intermediate level a4, the signal is regarded as a β-ray detected pulse.

Figure 6:
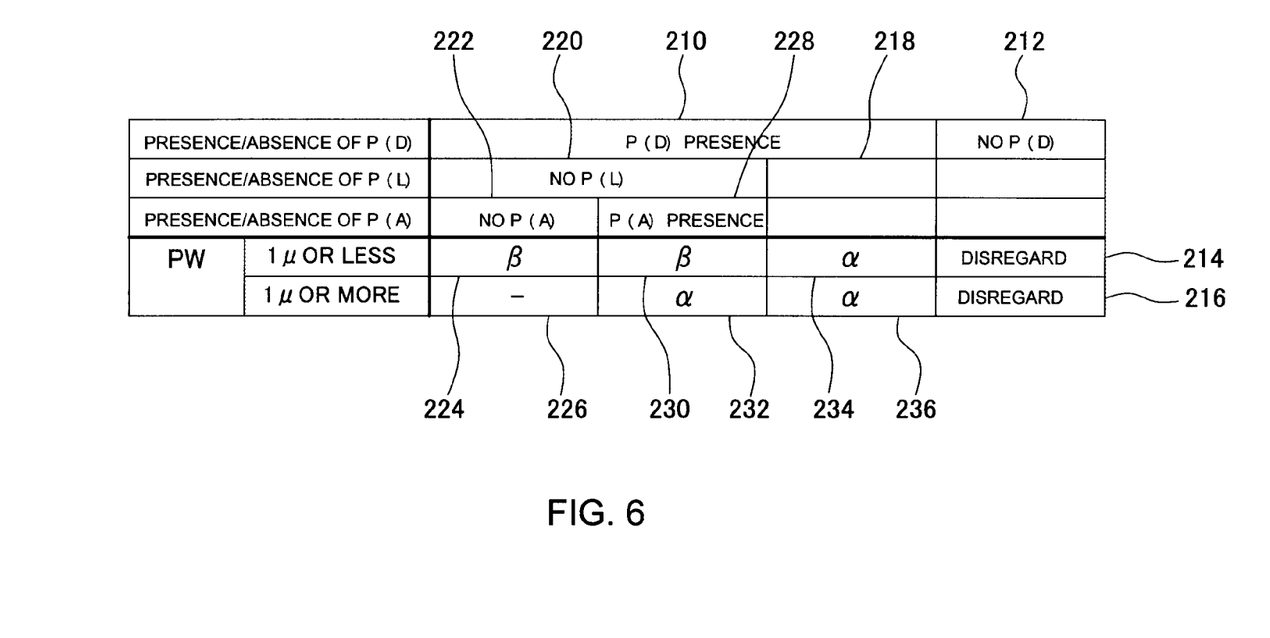
FIG. 6 Diagram for explaining a determination rule in a determination circuit.

FIG. 6 shows an example determination rule in the determination circuit illustrated in FIG. 1. The determination circuit first determines whether or not P(D) is present. If P(D) is not obtained as indicated by reference numeral 212, the signal is regarded as noise regardless of the content of other signals, as indicated by reference numerals 214 and 216. In other words, neither α-ray detection nor β-ray detection is determined in this case. If P(D) is obtained as indicated by reference numeral 210, on the other hand, a determination result may vary depending on the content of other signals.

In such a case, if it is determined that P(L) is obtained as indicated by reference numeral 218; that is, if it is determined that a significantly large pulse is obtained, α-ray detection is determined as indicated by reference numerals 234 and 236 regardless of the contents of other signals. If P(D) is obtained but P(L) is not obtained, on the other hand, the determination result may vary depending on the presence of P(A) and the magnitude of P(W).

In this case, if P(A) is not obtained, β-ray detection is determined as indicated by reference numeral 224. More specifically, as the crest value of the pulse is small, α-ray detection cannot be assumed. Also, as the pulse width should always be 1 μs or less in the case of β-ray detection, β-ray detection is determined in this case. If the pulse width is 1 μs or more in this case, it is determined as an error as indicated by numeral reference 226.

If P(A) is obtained as indicated by reference numeral 228, on the other hand, β-ray detection is determined as indicated by reference numeral 230 when the pulse width of the detected P(W) is 1 μs or less, and α-ray detection is determined as indicated by reference numeral 232 when the pulse width is 1 μs or more.

As described above, the determination circuit first performs determination on the precondition that an effective signal having a noise cut level or greater is present. In this case, if the magnitude of the output of the first amplifier prior to the processing performed by the second amplifier is huge, α-ray detection is determined unconditionally, and if not, β-ray detection or α-ray detection is determined in comprehensive consideration of the comparison results with the intermediate level and the pulse width. It is therefore possible to obtain an advantage that the radiation type can be determined accurately in accordance with various conditions.

In particular, in the present embodiment, as the pulse width is measured after converting a unipolar pulse to a bipolar signal, it is particularly possible to obtain an advantage that an error can be reduced in specifying the falling point; that is, the identification accuracy can be increased. While in the above embodiment, a cross point of the falling portion and the baseline is assumed to be a zero crossing point, it is also possible to set a level which is shifted from the baseline and specify a falling point as a point crossing the set level. It is similarly possible to specify a rising point based on a comparison with a threshold value which is offset from the baseline. The bipolar signal can be used generally for assessment of the pulse width, in addition to the use in the determination circuit describe above. In the above embodiment, as, for generation of a pulse width signal, a reference signal is generated based on the bipolar signal itself, there can be obtained an advantage that an effect of variations in the level of the baseline in the bipolar signal is reduced. This is also true for generation of the reference signal in the effective pulse discrimination signal generating circuit.

With the above structure, as it is possible to discriminate between α-ray detection and β-ray detection using only an output pulse output from a single photomultiplier tube, there can be obtained an advantage that the α-rays and the β-rays can be discriminated accurately with the whole structure of a radiation measuring instrument being simplified. It is therefore possible to provide practical survey meters and the like.

The invention claimed is:

1. A radiation measuring instrument, comprising:
    a detector configured to detect α-rays and β-rays and output a unipolar pulse;
    a preprocessing circuit configured to generate a bipolar pulse by applying waveform processing to the unipolar pulse output from the detector;
    a pulse width signal generating circuit configured to generate a pulse width signal representing a pulse width from a rising point to a falling point of the bipolar pulse;
    a large pulse detected signal generating circuit configured to generate a large pulse detected signal indicating that a crest value of the unipolar pulse is higher than a large pulse discrimination level, and
    a radiation type determining circuit configured to determine a radiation type of radiation from which the unipolar pulse is generated based at least on the pulse width signal and the large pulse detected signal.

2. The radiation measuring instrument according to claim 1, wherein
    the bipolar pulse comprises a first portion protruding from the baseline toward one side and a second portion protruding from the baseline toward the other side, the second portion being continuous to the first portion,
    the rising point is a front end point of the first portion, and the falling point is a back end point of the first portion.

3. The radiation measuring instrument according to claim 2, wherein
    the falling point is a cross point crossing the baseline.

4. The radiation measuring instrument according to claim 3, wherein
    the pulse width signal generating circuit comprises:
    a reference signal generating circuit configured to generate a reference signal by smoothing the bipolar pulse; and
    a comparison circuit configured to compare the bipolar pulse with the reference signal to identify the rising point and the cross point.

5. The radiation measuring instrument according to claim 4, wherein
    the pulse width signal generating circuit comprises an offset circuit configured to apply an offset to the bipolar pulse to thereby shift the bipolar pulse from a baseline represented by the reference signal, and
    the bipolar signal having the offset applied thereto is input to the comparison circuit.

6. The radiation measuring instrument according to claim 1, wherein
    the unipolar pulse having a crest value exceeding the large pulse discrimination level is regarded as a pulse generated by α-ray detection.

7. The radiation measuring instrument according to claim 1, further comprising:
    an effective pulse discrimination signal generating circuit configured to generate an effective pulse discrimination signal indicating that the bipolar pulse is an effective pulse having a crest value higher than a noise cut level and to output the effective pulse discrimination signal to the radiation type determining circuit,
    the noise cut level being a level for discriminating between noise and the effective pulse,
    the radiation type determining circuit determining the radiation type based at least on the pulse width signal, the large pulse detected signal, and the effective pulse discrimination signal.

8. The radiation measuring instrument according to claim 1, further comprising:
    a high level discrimination signal generating circuit configure to generate a high level discrimination signal representing whether a crest value of the bipolar pulse is higher or lower than an intermediate level and to output the high level discrimination signal to the radiation type determining circuit,
    the intermediate level being a level for discriminating between a high crest value that can be generated by α-ray detection and β-ray detection and a low crest value that can be generated only by β-ray detection,
    the radiation type determining circuit determining the radiation type based at least on the pulse width signal, the large pulse detected signal, and the high level discrimination signal.

9. The radiation measuring instrument according to claim 1, wherein
    the preprocessing circuit comprises a differentiating circuit and an integrating circuit.

10. The radiation measuring instrument according to claim 1, wherein the detector comprises a single photomultiplier tube.

* * * * *